US012580744B2

(12) United States Patent
Ati et al.

(10) Patent No.: US 12,580,744 B2
(45) Date of Patent: Mar. 17, 2026

(54) SUBSCRIPTION-BASED SYSTEM-ON-CHIP (SOC) HARDWARE FEATURE ENABLEMENT

(71) Applicant: QUALCOMM INCORPORATED, San Diego, CA (US)

(72) Inventors: Vasista Ati, Bangalore (IN); Vardhana Mruthyunjaya, Mangalore (IN); Kota Subba Rao Sajja, Bengaluru (IN); Ashish Mishra, Bhubaneswar (IN)

(73) Assignee: Qualcomm Incorporated, San Diego, CA (US)

( * ) Notice: Subject to any disclaimer, the term of this patent is extended or adjusted under 35 U.S.C. 154(b) by 33 days.

(21) Appl. No.: 18/674,701

(22) Filed: May 24, 2024

(65) Prior Publication Data

US 2025/0365136 A1 Nov. 27, 2025

(51) Int. Cl.
 H04L 29/06 (2006.01)
 H04L 9/08 (2006.01)
 H04L 9/32 (2006.01)
(52) U.S. Cl.
 CPC .......... H04L 9/0825 (2013.01); H04L 9/0822 (2013.01); H04L 9/3297 (2013.01)

(58) Field of Classification Search
 CPC ... H04L 9/0825; H04L 9/0822; H04L 9/3297; H04W 76/10; H04W 12/08
 See application file for complete search history.

(56) References Cited

U.S. PATENT DOCUMENTS

| | | | |
|---|---|---|---|
| 2017/0295018 A1* | 10/2017 | Whitehouse | .......... H04L 63/045 |
| 2021/0136100 A1* | 5/2021 | Gupta | ................ H04L 63/1433 |
| 2022/0237333 A1* | 7/2022 | Peng | ....................... G06F 21/76 |
| 2022/0343004 A1* | 10/2022 | Sobot | ................... G06N 3/0499 |

* cited by examiner

*Primary Examiner* — Yogesh Paliwal
(74) *Attorney, Agent, or Firm* — Smith Tempel Blaha LLC

(57) ABSTRACT

Core logic features of a system-on-chip (SoC) may be selectively enabled based on a subscription. A subscription request may be provided and transmitted from the computing device containing the SoC to a remote SoC configuration provider system. A response to the subscription request may be received from the configuration provider system and used to provide SoC configuration information. Feature enablement circuitry in the SoC may provide feature enablement signals to SoC core logic based on the SoC configuration information.

18 Claims, 8 Drawing Sheets

600

Begin

Provide subscription request. — 602

Transmit subscription request to SoC configuration provider system via a data communication link. — 604

Receive response to subscription request from SoC configuration provider system via data communication link. — 606

Provide SoC configuration information based on the response. — 608

Provide feature enablement signals to core logic circuitry of SoC based on the configuration information. — 610

End

100

104

SoC Configuration Provider System

106

102

Computing Device

108

SoC

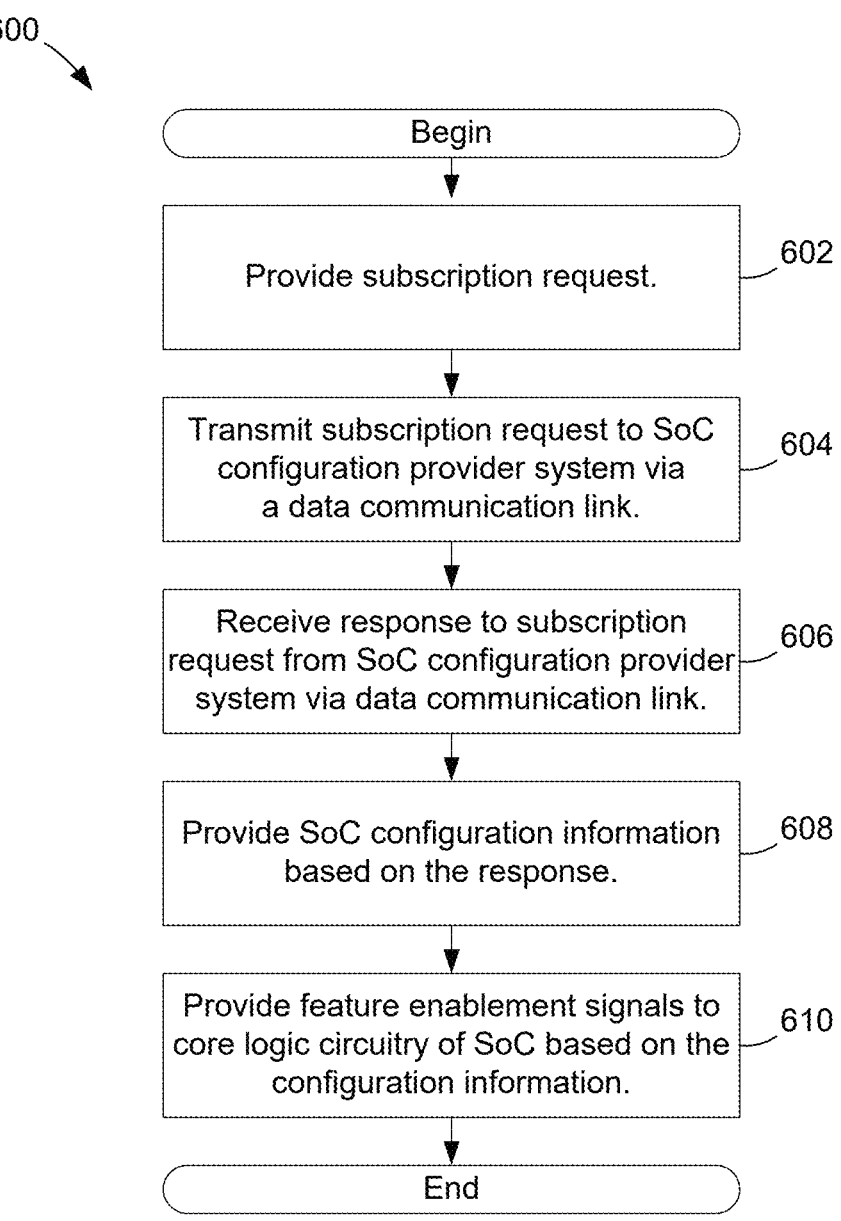

600

Begin

Provide subscription request.                                    602

Transmit subscription request to SoC
configuration provider system via                                604
a data communication link.

Receive response to subscription
request from SoC configuration provider                          606
system via data communication link.

Provide SoC configuration information                            608
based on the response.

Provide feature enablement signals to
core logic circuitry of SoC based on the                         610
configuration information.

End

FIG. 6

SUBSCRIPTION-BASED SYSTEM-ON-CHIP (SOC) HARDWARE FEATURE ENABLEMENT

DESCRIPTION OF THE RELATED ART

A computing device may include multiple processing subsystems, such as central processing units (CPUs), graphics processing units (GPUs), digital signal processors (DSPs), and neural processing units (NPUs). Wireless computing devices may also include radio transceiver subsystems. The multiple processors or subsystems may be integrated on a "system-on-chip" (SoC). Cellular handsets, tablets, automotive computing devices, so-called Internet-of-Things (IoT) devices, and wearable devices are just a few examples of computing devices that may include SoCs.

Computing device manufacturers, which may also be referred to as original equipment manufacturers (OEMs), may use the same SoC configured in different ways to offer computing devices (i.e., products) with different combinations of features or different grades of similar features. For example, a first OEM may produce a smartphone containing an SoC that provides a high-resolution video capture feature and an advanced video encoding feature, while a second OEM may produce a smartphone containing the same SoC that provides lower-resolution video capture but also provides the advanced video encoding feature. As the features are embedded in the SoC hardware, the same SoC may be capable of providing any combination of these features by selectively "enabling" the features before the end-user begins using the device. That is, the differentiation lies not in the SoC's structure or architecture (i.e., hardware) but in which features of that hardware have been enabled.

An SoC provider may use programmable fuses to enable a particular combination of features to suit a particular OEM's requirements. An SoC may contain an array of fusible links or "fuses," which are one-time programmable hardware elements (e.g., metal or silicon traces). By selectively disabling (colloquially referred to as "blowing") a particular combination of fuses, the SoC can be programmed or configured with a corresponding combination of features in an essentially irreversible manner. The fuse array thus serves as a read-only form of memory to store the SoC feature configuration. When the SoC is booted, the feature configuration encoded in the fuse array may be read and used to enable or disable SoC features. The one-time programmable hardware nature of such fuses provides security against subsequent attempts to alter the configuration.

While from an OEM's perspective the inalterability of a fuse-enabled SoC feature configuration may provide security and product-differentiation advantages, from a computing device user's perspective it may limit flexibility.

SUMMARY OF THE DISCLOSURE

Systems, methods, and other examples of enabling system-on-chip (SoC) features based on a subscription are disclosed.

An exemplary method for enabling SoC features may include providing, by feature subscription circuitry of the SoC, a subscription request. The method may also include transmitting the subscription request to a remote configuration provider system via a data communication link and receiving a response to the subscription request from the configuration provider system via the data communication link. The method may further include providing, by feature subscription circuitry, SoC configuration information based on the response. The method may still further include providing, by feature enablement circuitry of the SoC, feature enablement signals based on the SoC configuration information to core logic circuitry of the SoC.

An exemplary system for enabling SoC features may include feature subscription circuitry and feature enablement circuitry in the SoC. The feature subscription circuitry may be configured to provide a subscription request. The feature subscription circuitry may also be configured to transmit the subscription request to a remote configuration provider system via a data communication link and to receive a response to the subscription request from the configuration provider system via the data communication link. The feature subscription circuitry may further be configured to provide SoC configuration information based on the response. The feature subscription circuitry may still further be configured to provide feature enablement signals based on the SoC configuration information to core logic circuitry of the SoC.

An exemplary system for providing an SoC configuration may include subscription request processing circuitry and configuration providing circuitry. The subscription request processing circuitry may be configured to receive, via a data communication link, a subscription request from a device having the SoC. The subscription request may include a device identifier identifying the SoC and a user identifier identifying a subscription requestor. The configuration providing circuitry may be configured to provide updated SoC configuration information based on the subscription request and current SoC configuration information for the SoC identified by the device identifier. The configuration providing circuitry may further be configured to transmit the updated SoC configuration information to the device having the SoC via the data communication link.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral encompass all parts having the same reference numeral in all Figures.

FIG. 6 is a flow diagram illustrating an SoC feature subscription method, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
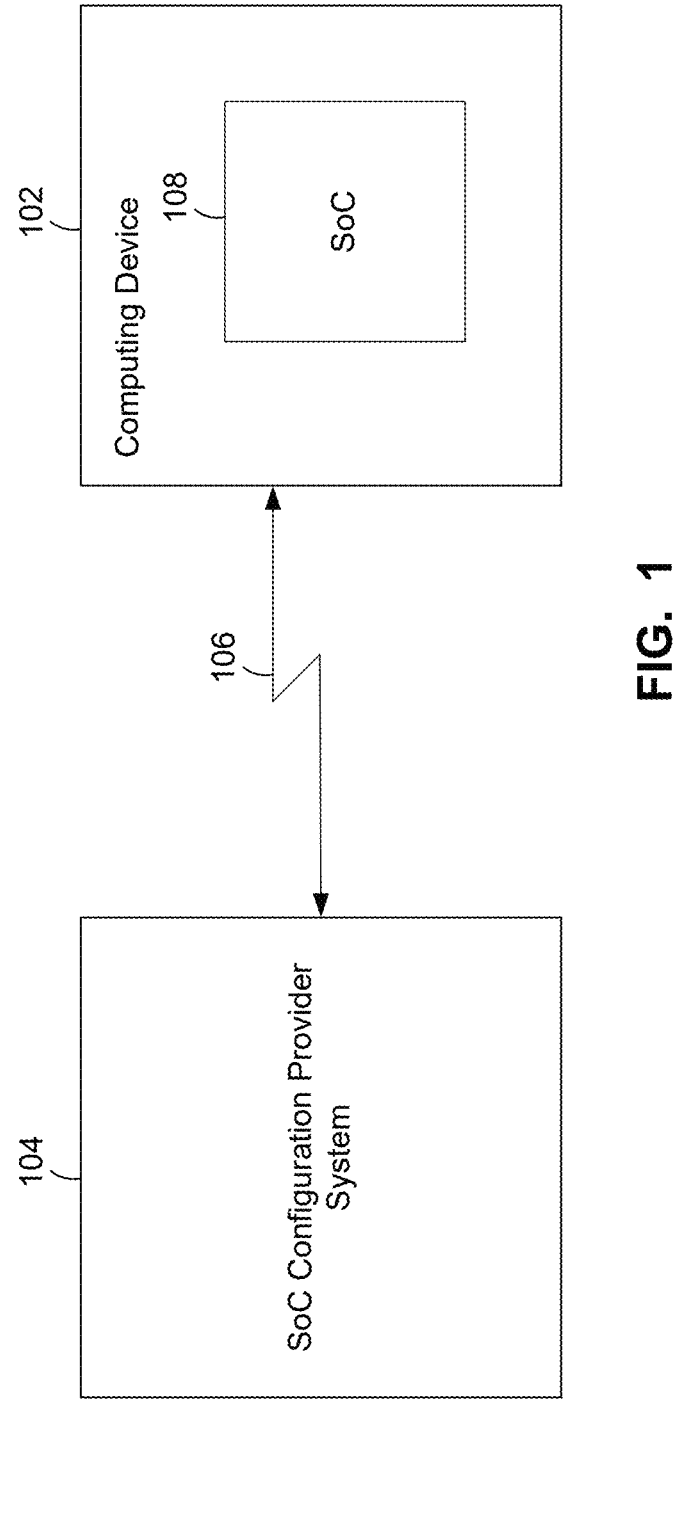
FIG. 1 is a block diagram of a system in which a computing device may request and receive a subscription to new or updated system-on-chip (SoC) configuration features from a remote SoC configuration provider system, in accordance with exemplary embodiments.

As shown in FIG. 1, in an illustrative or exemplary embodiment a system 100 may include a computing device 102 coupled to a remote SoC configuration provider system 104 by a data communication link 106. The computing device 102 may be of any type, such as, for example, a desktop or laptop computer, a portable computing device (e.g., smartphone), an automotive device, an Internet of Things (IoT) device, a wearable device such as a wrist-watch-style device, eyewear, a headset, etc. The data communication link 106 may be of any type, such as, for example, wireless broadband (e.g., cellular), satellite, Wi-Fi, a wired or fiber-optic link, etc.

The computing device 102 may include a system-on-chip (SoC) 108 as well as various other components (not shown in FIG. 1 for purposes of clarity). The SoC 108 may include any number of hardware (i.e., circuitry) features that can be selectively enabled. The term "configuration" or "SoC configuration" may be used herein to refer to the set of all SoC features, in which a first subset thereof consists of enabled features and a second subset thereof consists of disabled features. In accordance with the solutions described below, a user (not shown) of the computing device 102 may request a configuration "subscription" from the provider system 104 via the data communication link 106 and, in response, the provider system 104 may provide the requested configuration to the computing device 102 via the data communication link 106. Stated another way, the user may subscribe to an SoC configuration. The subscription (i.e., the subscribed-to configuration) may be limited in time and thus may expire. As described below, when a subscription expires, the SoC 108 may revert to a previous configuration or a default configuration. Although not shown for purposes of clarity, a payment system may be used by the user to pay for the subscription (e.g., payment to the provider system 104 via the data communication link 106), and the subscription may be provided based on a condition of such payment.

Figure 2:
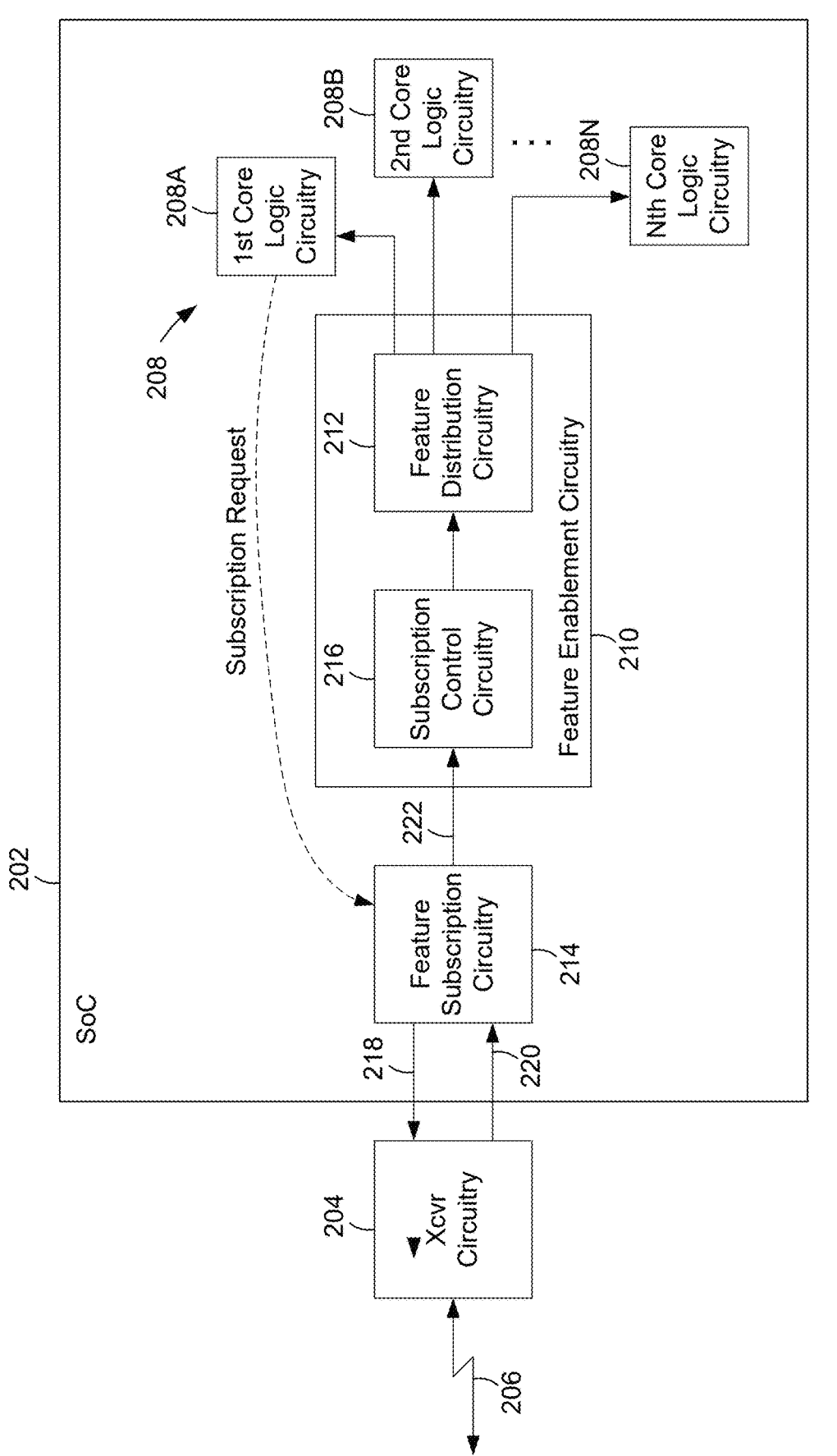
FIG. 2 is a block diagram of a portion of a computing device comprising a data communication link transceiver and an SoC having a feature subscription system, in accordance with exemplary embodiments.

In FIG. 2, an SoC 202, which may be an example of the above-referenced SoC 108 (FIG. 1), is shown coupled to transceiver (Xcvr) circuitry 204. The transceiver circuitry 204 may be used in the computing device to communicate via a data communication link 206, which may be an example of the above-described data communication link 106 (FIG. 1). In some wireless communication contexts the transceiver circuitry 204 may be referred to as a modem. Although in the illustrated example the transceiver circuitry 204 is external to the SoC 202, in other examples such transceiver circuitry may be included internally to such an SoC.

The SoC 202 may include any number of core logic circuitry blocks 208, such as a first core logic circuitry block 208A, a second core logic circuitry block 208B, etc., through an Nth core logic circuitry block 208N. The core logic circuitry blocks 208 may be of various types. For example, the first core logic circuitry block 208A may be a central processing unit (CPU) or portion thereof. In an alternative example (not shown) in which the SoC includes an internal transceiver or modem, such a transceiver or modem may comprise one or more other such core logic circuitry blocks. Still other types of core logic circuitry blocks 208 may include graphics processing units (GPUs), neural processing units (NPUs), camera image processors, audio-video encoders and decoders, memory controllers, etc. Although not shown for purposes of clarity, the core logic circuitry blocks 208 may communicate with each other via one or more buses or other data interconnects. Each core logic circuitry block 208 may have one or more hardware (i.e., circuitry) features that can be selectively enabled or disabled.

The SoC 202 may include feature enablement circuitry 210 that may be configured to enable a selected first subset of the features while a second subset of the features are disabled. The feature enablement circuitry 210 may include feature distribution circuitry 212 configured to distribute feature enablement signals to the various core logic circuitry blocks 208. For example, each such feature enablement signal may have an asserted state in response to which a corresponding feature is enabled and a de-asserted state in response to which a corresponding feature is disabled. The feature enablement circuitry 210 may perform this feature enablement when the SoC 202 is booted or otherwise before the SoC 202 begins normal or so-called mission-mode operation. (The term "mission-mode" refers to a state of operation or use of a computing device by an end-user.) The above-referenced selectably enablable SoC features may also be referred to for brevity herein as "features" or "SoC features." The term "configuration" may be used herein to refer to the set of all SoC features, in which a first subset thereof consists of enabled features and a second subset thereof consists of disabled features.

It has long been a practice of SoC manufacturers to offer different configurations of the same SoC to suit the demands of the entity's customers, which may be manufacturers or other providers of computing devices that include the SoC as a component. Such computing device manufacturers or providers are commonly referred to as original equipment manufacturers or "OEM"s. For example, a first OEM may desire to provide a computing device in which all SoC features are enabled, while a second OEM may desire to provide a different computing device in which fewer than all SoC features are enabled. Or, for example, a first OEM may desire to provide a device in which a first encoding protocol is enabled and a second encoding protocol is disabled, while a second OEM may desire to provide a device in which the second encoding protocol is enabled and the first encoding protocol is disabled. An encoding (e.g., video encoding) protocol is mentioned here only as an example of a feature. An SoC may have any number (e.g., dozens, hundreds, or thousands) of such features, i.e., each of which can be selectably enabled or disabled. An SoC provider may offer OEMs a selection of different SoC configurations, analogously to a vendor offering a selection of different products. Vendors have traditionally used the term stock keeping unit or "SKU" to refer to a unique identifier (e.g., a number or code) associated with each different product offered. An SoC manufacturer may use an array of one-time programmable fuses in the SoC to provide an SoC in a configuration requested by an OEM. The terms "SKU" and "configuration identifier" may be used synonymously herein to refer to a unique identifier associated with each different SoC configuration. It may be appreciated that in an SoC in which one-time programmable fuses alone are used to determine the set of enabled features, an SoC configuration cannot be changed by an end-user of the computing device. That is, although such an SoC may support more features than those which are enabled when the end-user receives the computing device, the SoC forever prevents the end-user from accessing those features.

In accordance with the solutions described herein, in addition to, or alternatively to, providing an SoC configuration using one-time programmable fuses, an SoC configuration may be provided using a subscription-based system. That is, using the subscription system, an end-user may subscribe to a configuration (i.e., a set of one or more enabled features). Accordingly, for example, the SoC 202 may include feature subscription circuitry 214, and the feature enablement circuitry 210 may include subscription control circuitry 216.

The feature subscription circuitry 214 may be configured to provide a subscription request 218. For example, the feature subscription circuitry 214 may be configured to receive user input (e.g., from the CPU 208A, as conceptually indicated by the broken-line arrow) representing a user's request to subscribe to a feature and to include in the subscription request 218: information identifying: the user (i.e., a user identifier or "user_id"); the feature (i.e., a feature identifier or "feat_id"); the SoC 202 (i.e., a device identifier or "device_id"); and a requested duration or time period for the subscribed-to feature to remain enabled (i.e., a subscription time identifier or "sub_time_id"). The feature subscription circuitry 214 may be configured to use the transceiver circuitry 204 to transmit the subscription request 218 to a subscription provider (not shown in FIG. 2) via the data communication link 206. The feature subscription circuitry 214 may similarly be configured to use the transceiver circuitry 204 to receive a subscription response 220 from the subscription provider via the data communication link 206. Based on the subscription response 220, the feature subscription circuitry 214 may further be configured to provide updated configuration information 222 to the feature enablement circuitry 210. The feature enablement circuitry 210 may then adjust or otherwise provide the above-described feature enablement signals to the core logic circuitry 208 based on the updated configuration information 222.

The subscription control circuitry 216 may control aspects of operation of the feature distribution circuitry 212. For example, the subscription control circuitry 216 may be configured to limit the amount of time during which the subscribed-to features remain enabled. The subscription control circuitry 216 may be configured to select whether the set of enabled features (i.e., SoC configuration) corresponds to a valid subscription or corresponds to a default configuration. For example, when the subscription control circuitry 216 determines that a subscription time has expired, the subscription control circuitry 216 may signal the feature distribution circuitry 212 to replace the configuration corresponding to the then-expired subscription with a default configuration determined by a fuse array (not shown in FIG. 2).

Figure 3:
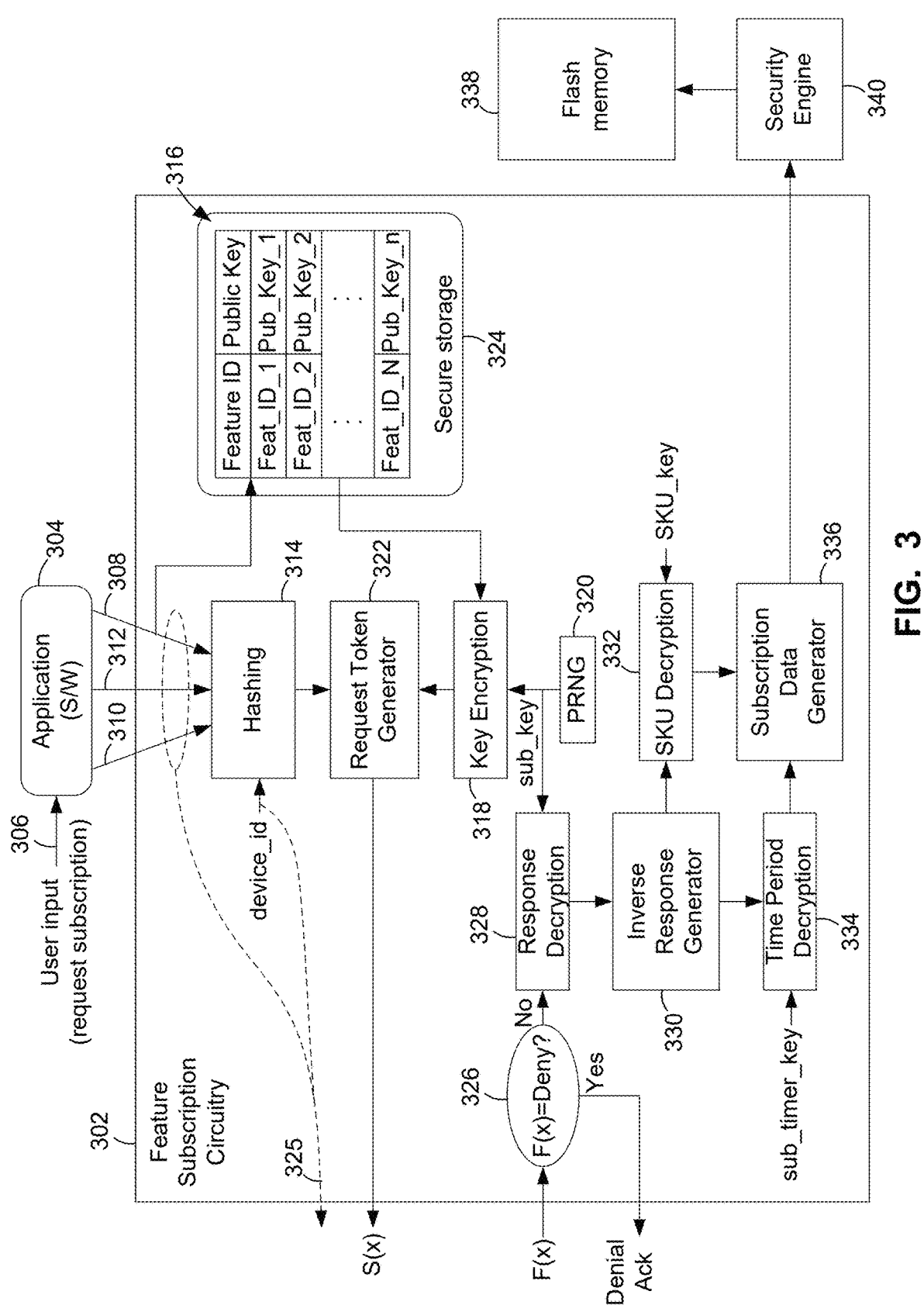
FIG. 3 is a block diagram showing feature subscription circuitry of the feature subscription system of FIG. 2, in accordance with exemplary embodiments.

In FIG. 3, feature subscription circuitry 302, which may be an example of the above-described feature subscription circuitry 214 (FIG. 2), is shown in block diagram form. In an example of operation, an application (software) 304 may be executing on a processor (not separately shown in FIG. 2). The application 304 may receive user input 306, requesting a subscription. In an example, the application 304 may be gaming software, which may prompt the user to indicate whether the user would like to subscribe to an increased graphics performance feature. In another example, the application 304 may be CPU-intensive, and may prompt the user to indicate whether the user would like to subscribe to increased CPU performance (e.g., by enabling additional CPU cores). In still another example, the application software 304 may be controlling streaming video playback, and may prompt the user to indicate whether the user would like to add an advanced video decoder feature. In yet another example, the application 304 may prompt the user to indicate whether the user would like to access advanced camera features. A subscription to such a feature may be limited in time, such as the duration of the game, the duration of an anticipated photography session, etc., or may be selectable by the user (e.g., a number of hours or days, etc.). In addition to, or alternatively to prompting a user, the application 304 may obtain the user input 306 in other ways, such as a "control panel" or "options" menu. Although the SoC hardware that relates to such features may not be apparent to a user (e.g., enabling additional CPU cores to enhance performance), the application 304 may provide a feature identifier (feat_id) 308 identifying a feature that is responsive to the user's request.

The feature identifier 308 forms a portion of the subscription request information. Other portions of the subscription request information may include a user identifier (user_id) 310 and a subscription time identifier (sub_time_id) 312. The feature subscription circuitry 302 may include hashing logic 314. The hashing logic 314 may be configured to receive as inputs the above-described feature identifier 308, user identifier 310, and subscription time identifier 312, as well as a device identifier (device_id) that identifies the SoC, and to hash these four values together. That is the hashing logic 314 may be configured to combine these four individual values into a single value, which may be referred to as H(x).

The feature subscription circuitry 302 may further include a device key table 316, subscription key encryption logic 318, and a pseudo-random number generator (PRNG) 320. In the device key table 316 each of N (where N may be any number) feature identifiers is paired with a corresponding feature public key. That is, a first feature identifier Feat_ID_1 is paired with a first feature public key Pub_Key_1, a second feature identifier Feat_ID_2 is paired with a second feature public key Pub_Key_2, etc., through an Nth feature identifier Feat_ID_N, which is paired with an Nth feature public key Pub_Key_n. The device key table 316 may be stored in secure storage 324. The secure storage 324 may be a portion of a memory that is not accessible by processors such as the CPU, etc. The secure storage 324 may be non-volatile read-only memory. Nevertheless, in other examples such a key table may be stored in other types of memory.

The output of the PRNG 320 may be used as a subscription key (sub_key) that may enhance the security of the subscription request and response. First, the feature identifier (feat_id) provided by the application 304 may be used to look up a corresponding feature public key in the device key table 316. The subscription key encryption logic 318 may receive as inputs the feature public key looked up in the key table 316 and the output of the PRNG 320 (i.e., the subscription key). The subscription key encryption logic 318 may thus be configured to provide an encrypted subscription key (key_cipher) by encrypting the subscription key using the feature public key. The subscription key encryption logic 318 may implement any symmetric key encryption algorithm, such as, for example, Advanced Encryption Standard (AES), variations thereof, etc.

The feature subscription circuitry 302 may include subscription request token generator logic 322, which may also be referred to as a request token "generator" function G( ). The feature subscription generator logic 322 may receive as inputs the encrypted subscription key from the subscription key encryption logic 318 and the hashed value H(x) from the hashing logic 314. The subscription request token generator logic 322 or function G( ) may be configured to provide a subscription request token S(x) as an output, based on the encrypted subscription key (key_cipher) and the hashed value H(x). The request token generator function G( ) may be any function that is reversible in nature, i.e., an inverse function G'( ) can recover the encrypted subscription key and the hashed value H(x). A straightforward example of a request token generator function G( ) may be a concatenation function: G(key_cipher, H(x))=Concatenate (key_cipher, H(x)). In such an example, the inverse function G'(X) would be a de-concatenation function: De-Concatenate (X)=key_cipher, H(x).

As described above with regard to FIGS. 1-2, a computing device 102 (FIG. 1) may be configured to transmit a subscription request to an SoC configuration provider system 104. Accordingly, in the example shown in FIG. 3, the feature subscription circuitry 302 may transmit a subscription request comprising the subscription request token S(x) and associated request information 325, which may include the feature identifier (feat_id) 308, the user identifier (user_id) 310, the subscription time identifier (sub_time_id) 312, and the device identifier (device_id).

Figure 4:
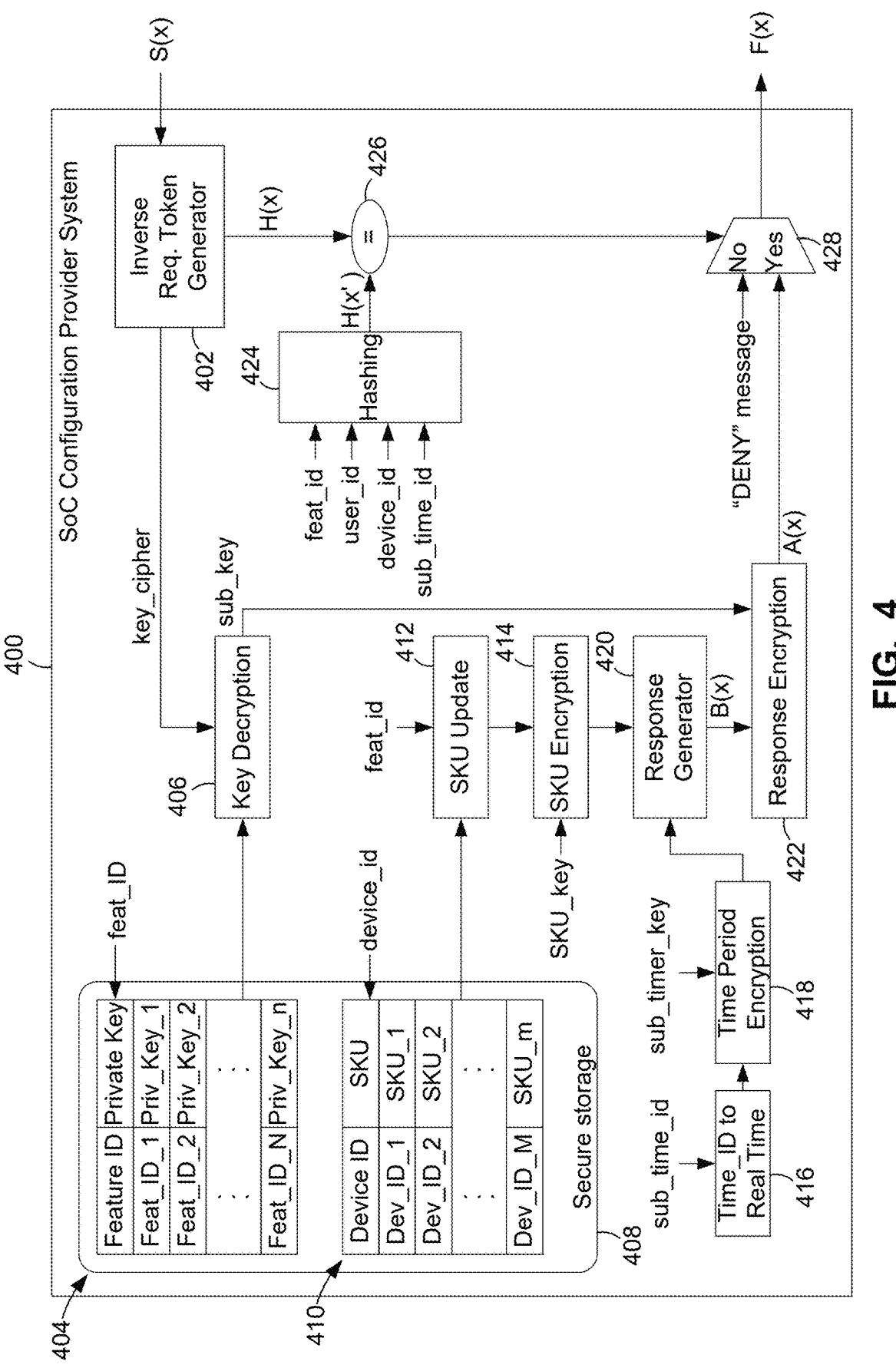
FIG. 4 is a block diagram of an SoC configuration provider system, in accordance with exemplary embodiments.

Referring now to FIG. 4, an SoC configuration provider system 400, which may be an example of the above-described SoC configuration provider system 104 (FIG. 1), is shown in block diagram form. The SoC configuration provider system 400 may include inverse request token generator logic 402. The inverse request token generator logic 402, which may also be referred to as the function G'( ) may be the inverse of the above-described (FIG. 3) subscription request token generator logic 322 or function G( ). The inverse request token generator logic 402 may be configured to receive the subscription request token S(x) as its input. The inverse request generator logic 402 may provide as its outputs the encrypted subscription key (key_cipher) and the hashed value H(x), based on the subscription request token S(x). Meanwhile, the SoC configuration provider system 400 may be configured to also receive the feature identifier (feat_id), the user identifier (user_id), the device identifier (device_id) and the subscription time identifier (sub_time_id), which, as described above with regard to FIG. 3, are other portions of the subscription request.

The SoC configuration provider system 400 may further include a provider key table 404 and subscription key decryption logic 406. In the provider key table 404 each of the N feature identifiers is paired with a corresponding feature private key. The feature identifiers and the number N may be the same as described above with regard to the device key table 316 (FIG. 3). Thus, the first feature identifier Feat_ID_1 is paired with a first feature private key Priv_Key_1, the second feature identifier Feat_ID_2 is paired with a second feature private key Priv_Key_2, etc., through an Nth feature identifier Feat_ID_N, which is paired with an Nth feature private key Priv_Key_n. The provider key table 404 may be stored in secure storage 408. The secure storage 408 may be a portion of a memory that is not accessible by processors (not shown), e.g., used only for the functions described herein.

The feature identifier (feat_id) may be used to look up a corresponding feature private key in the provider key table 404. The subscription key decryption logic 406, which may be the inverse of the above-described subscription key encryption logic 318 (FIG. 3), may receive as inputs the feature private key looked up in the provider key table 404 and the encrypted subscription key (key_cipher). The subscription key decryption logic 406 may thus be configured to provide or recover the subscription key (sub_key) by decrypting the encrypted subscription key using the feature private key.

The SoC configuration provider system 400 may include a SKU table 410, which may be stored in the secure storage 408. In the SKU key table 410 each of M device identifiers is paired with a corresponding SKU (i.e., a unique identifier). Each device identifier may uniquely identify an SoC whose configuration or SKU the SoC configuration provider system 400 keeps track of. In the SKU table 410, a first device identifier Dev_ID_1 is paired with a SKU_1, a second device identifier Dev_ID_2 is paired with a SKU_2, etc., through an Mth device identifier Dev_ID_M, which is paired with an Mth SKU_m.

The SoC configuration provider system 400 may include SKU update logic 412 and SKU encryption logic 414. The device identifier (device_id) may be used to look up a corresponding device's (i.e., SoC's) then-existing configuration or SKU in the provider SKU table 410. The SKU update logic 412 may be configured to receive as inputs the SKU looked up in the SKU table 410 and the feature identifier (feat_id). Note that the feature identifier identifies a feature that is being requested to be added to the set of features that make up an SoC's then-existing configuration or SKU. The SKU update logic 412 may be configured to determine a new or updated SKU that represents the SoC's then-existing set of features plus the requested (identified) feature.

The SKU encryption logic 414 may be configured to encrypt the new or updated SKU using yet another key, which may be referred to as the SKU key (SKU_key). The SKU key may be any type of secure key, and the SKU encryption logic 414 may implement any symmetric key encryption algorithm.

The new or updated SKU may be only a portion of the information that is associated with the subscription. Another portion of the information that is associated with the subscription may be the subscription time or duration that the subscription is to remain effective or valid. As noted above, the subscription request may include a subscription time identifier (sub_time_id). A time-identifier-to-real-time converter 416 may be configured to determine a subscription time period or amount of time (e.g., a number of minutes, hours, days, etc.) that corresponds to or is based on the subscription time identifier.

Subscription time period encryption logic 418 may be configured to then encrypt the determined subscription time period using still another key, which may be referred to as the subscription timer key (sub_timer_key). The subscription timer key may be any type of secure key, and the subscription time period encryption logic 418 may implement any symmetric key encryption algorithm.

The SoC configuration provider system 400 may further include subscription response generator logic 420, which may also be referred to as a response generator function G( ). The response generator logic 420 may receive as inputs the encrypted SKU (SKU_cipher) from the SKU encryption logic 414 and the encrypted subscription time period (period_cipher) from the subscription time encryption logic 418. The response generator logic 420 or response generator function G( ) may be configured to provide a value B(x) as an output, based on the encrypted SKU (SKU_cipher) and the encrypted subscription time period (period_cipher). The response generator function G( ) may be any function that is reversible in nature, i.e., an inverse function G'( ) can recover the encrypted SKU and the encrypted subscription time period. A straightforward example of the response generator function G( ) may be a concatenation function: G(SKU_cipher, period_cipher)=Concatenate(SKU_cipher, period_cipher). In such an example, the inverse response function G'(X) would be a de-concatenation function: De-Concatenate (X)=SKU_cipher, period_cipher.

Response encryption logic 422 may be configured to encrypt the value B(x) received from the response generator logic 420 using the subscription key (sub_key) received from the key decryption logic 406. The encrypted value B(x), i.e., the output of the response encryption logic 422, may be referred to as A(x).

Providing the updated SKU and the subscription time period in response to the subscription request may be conditioned on successful verification of the subscription request information. Hashing logic 424 may be configured in a manner similar to the above-described hashing logic 314 (FIG. 3). Accordingly, the hashing logic 424 may be configured to receive as inputs the feature identifier (feat_id), user identifier (user_id), subscription time identifier (sub_time_id), and device identifier (device_id), and to hash these four values together. That is the hashing logic 424 may be configured to combine these four individual values into a single value, which may be referred to as H(x'). A comparator 426 may be configured to compare the value H(x) received from the inverse request token generator logic 402 with the value H(x') received from the response encryption logic 422. In other words, the hashed subscription request information included in the subscription request token S(x) received via the data communication link may be compared with the same subscription request information received separately via the data communication link and hashed locally in the configuration provider system 400. The output of the comparator 426 may indicate whether the subscription request information matches, i.e., are equal to each other. For example, the output of the comparator 426 may be a binary indication representing either a match or no match.

The output of the comparator 426, indicating either a match or no match, may be provided to the selector input of multiplexing logic 428. When the result of the comparison is a match (i.e., the verification of the subscription request information succeeds), the multiplexing logic 428 selects a first one of its two inputs ("Yes"), to which the output A(x) of the response encryption logic 422 is coupled. Thus, when the result of the comparison is a match, the output of the multiplexing logic is A(x), i.e., the encrypted response. When the result of the comparison is no match, the multiplexing logic 428 selects a second one of its two inputs ("No"), to which a "DENY" message or indication, indicating that the requested subscription is denied, is provided. Thus, when the result of the comparison is no match (i.e., the verification of the subscription request information fails), the output of the multiplexing logic 428 is the subscription denial indication. The output of the multiplexing logic 428 may be referred to as the subscription response or a value F(x) and may be transmitted from the SoC configuration provider system 400 via the data communication link to the computing device (not shown in FIG. 4) that requested the subscription. Thus, when the verification of the subscription information succeeds, the subscription response may comprise the updated SoC configuration. When the verification of the subscription information fails, the subscription response may comprise the above-described denial, and the subscription response does not include an updated SoC configuration, i.e., the SoC configuration provider system 400 refrains from providing an updated SoC configuration to the requesting computing device.

Returning to FIG. 3, the subscription response or value F(x) may be received via the data communication link by the feature subscription circuitry 302 of the computing device that requested the subscription. A comparator 326 may be configured to determine whether the subscription response or value F(x) is the above-described subscription denial indication. If the comparator 326 determines that the subscription response F(x) is the subscription denial indication, then the feature subscription circuitry 302 may transmit an indication acknowledging the denial to the SoC configuration provider system 400 (FIG. 4) via the data communication link.

If the comparator 326 determines that the subscription response F(x) is not the subscription denial indication, then the feature subscription circuitry 302 may recover the subscription information from the subscription response. Response decryption logic 328 may decrypt the subscription response using the subscription key (sub_key). The decrypted subscription response may be provided to the input of inverse response generator logic 330, i.e., a generator function that is the inverse of the above-described response generator logic 420 (FIG. 4). Based on the decrypted subscription response, the inverse response generator logic 330 may provide the encrypted SKU (SKU_cipher) and the encrypted subscription time period (period_cipher). SKU decryption logic 332 may receive the encrypted SKU and decrypt it using the same SKU_key described above (FIG. 4) with regard to the SKU encryption logic 414. Time period decryption logic 334 may receive the encrypted subscription time period and decrypt it using the same subscription timer key (sub_timer_key) described above (FIG. 4) with regard to the time period encryption logic 418.

Subscription data generator logic 336 may receive as inputs the (decrypted) SKU from the SKU decryption logic 332 and the (decrypted) subscription time period from the time period decryption logic 334. The subscription data generator logic 336 may be configured to generate data that represents the combined SKU and subscription time period. The generator function or G( ) may be similar to others described above. The output of the subscription data generator logic 336 represents the combined subscribed-to SKU and subscription time period, may be stored in a flash memory 338 or other non-volatile storage under control of a security engine 340.

Figure 5:
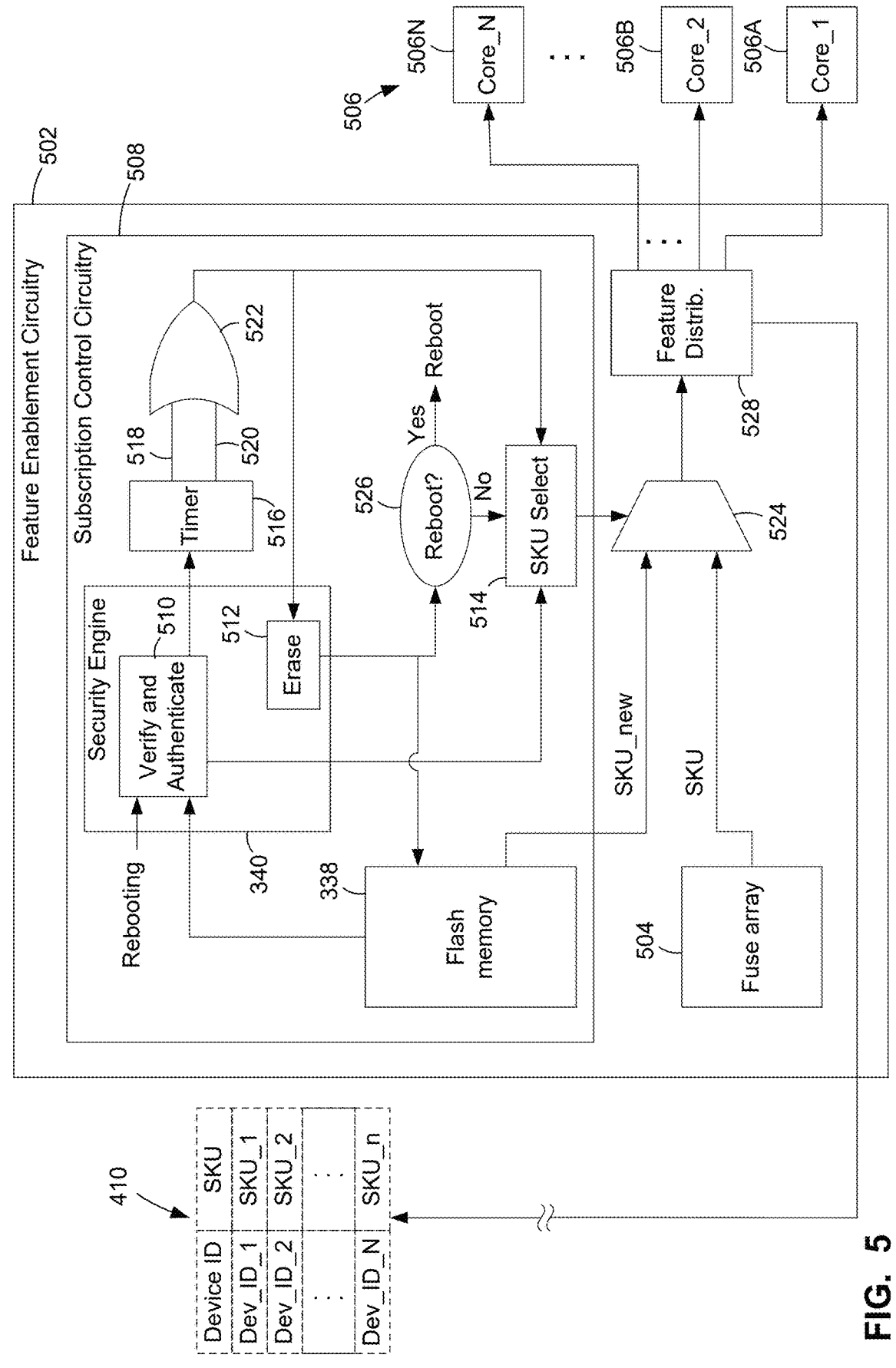
FIG. 5 is a block diagram showing feature enablement circuitry associated with the feature subscription system of FIG. 2, in accordance with exemplary embodiments.

As shown in FIG. 5, feature enablement circuitry 502 may include the flash memory 338 described above with regard to FIG. 3 as well as a fuse array 504. In the illustrated example, the fuse array 504 may be used as an alternative source for the SoC configuration information when there is no subscription, such as after a subscription expires. The feature enablement circuitry 502 may be coupled to core logic circuitry blocks 506, which may comprise a first core logic circuitry block 506A ("Core_1"), a second core logic circuitry block 506B ("Core_2"), etc., through an Nth core logic circuitry block 506N ("Core_N"). The feature enablement circuitry 502 and core logic circuitry blocks 506 may be examples of the feature enablement circuitry 210 and core logic circuitry blocks 208, respectively, described above with regard to FIG. 2.

The feature enablement circuitry 502 may include subscription control circuitry 508, which may be an example of the above-described subscription control circuitry 216 (FIG. 2). The subscription control circuitry 508 may include portions or aspects of the security engine 340 described above with regard to FIG. 3, such as verification and authentication logic 510 and erasing logic 512. The verification and authentication logic 510 may be configured to detect rebooting of the SoC. In response to such detection of rebooting, the verification and authentication logic 510 may read from the flash memory 338 the above-described subscription information that represents the subscribed-to SKU (configuration) and subscription time period. The verification and authentication logic 510 may be configured to authenticate and verify this data (i.e., the combined SKU and time period) read from the flash memory 338 and to provide an indication of the result to SKU selection logic 514.

The verification and authentication logic 510 may also be configured to provide the (authenticated and verified) subscription time period to a timer 516. The verification and authentication logic 510 may be configured to provide the subscription time period only once, i.e., after the first verification and authentication is performed; subsequent SoC reboots without a change in the data read from the flash memory 338 do not affect the operation of the timer 516. Although not shown for purposes of clarity, the timer 516 may be powered from a source on the SoC that continues to supply power even when the computing device is turned off, in a sleep state, etc. The timer 516 may thus be configured to begin timing the subscription time period and to continue this timing operation independently of other SoC operations or events until the subscription time period expires.

When the subscription time period expires, the timer 516 may assert an indication 518 of such subscription time period expiration. In the illustrated example, as an additional security feature, the timer 516 may also be configured to detect tampering and to assert an indication 520 of such tampering if detected. A logical-OR operation 522 (conceptually represented in FIG. 5 by an OR gate symbol) may determine whether either of the indications 518 and 520 are asserted, and to provide the result of that determination, indicating whether there is a valid subscription, to the erasing logic 512 and to the SKU selection logic 514. The erasing logic 512 may be configured to erase the data representing the SKU and subscription time period from the flash memory 338 in response to assertion of the indication 518 or 520, i.e., when no valid subscription exists. Note that no valid subscription exists: upon expiration of a subscription's time period; or upon detection of tampering; or when the information read from the flash memory 338 upon rebooting fails verification/authentication; or upon booting before any subscription has been provided.

The subscription control circuitry 508 may include multiplexing logic 524 having two data inputs: a first input configured to receive the subscribed-to SKU (SKU_new) read from the flash memory 338 by the security engine 340; and a second input configured to receive a SKU that may be read from the fuse array 504. The SKU read from the fuse array 504 may be a default SKU representing a default configuration in which the SoC may operate when no valid subscription exists.

The multiplexing logic 524 may select the subscribed-to SKU (SKU_new) read from the flash memory 338 when the output of the SKU selection logic 514 indicates a valid subscription exists. The multiplexing logic 524 may select the SKU read from the fuse array 504 when the output of the SKU selection logic 514 indicates no valid subscription exists. Reboot logic 526 may be included and configured to determine whether an SoC reboot is needed to completely disable a subscribed-to feature upon expiration of the subscription time period or detection of tampering. If the reboot logic 526 determines that an SoC reboot is needed, the reboot logic 526 may trigger the reboot. If the reboot logic 526 determines that an SoC reboot is not needed, the reboot logic 526 may refrain from triggering a reboot, thereby enabling the SKU selection logic 514 to operate as described above.

The output of the multiplexing logic 524 may be provided to feature distribution logic 528, which may be an example of the above-described feature distribution logic or circuitry 212 (FIG. 2). Accordingly, the feature distribution logic 528 may be configured to distribute feature enablement signals to the various core logic circuitry 506. When a valid subscription exists and the output of the multiplexing logic 524 therefore reflects the subscribed-to SKU (SKU_new), the feature distribution logic 528 may distribute the set of feature enablement signals corresponding to the subscribed-to SKU to the core logic circuitry 506. When no valid subscription exists and the output of the multiplexing logic 524 therefore reflects the SKU programmed in the fuse array 504, the feature distribution logic 528 may distribute the set of feature enablement signals corresponding to the fuse-programmed SKU to the core logic circuitry 506.

The feature distribution logic 528 may also be configured to transmit the device identifier and a SKU identifier that identifies the device's updated or subscribed-to SKU to the SoC configuration provider system 400 (FIG. 4) via the data communication link. The SoC configuration provider system 400 may then update the above-described SKU table 410 to replace the device's SKU with which the device was previously configured with the device's updated or subscribed-to SKU. In this manner, the SoC configuration provider system 400 may track or maintain an up-to-date account of each device's (i.e., SoC's) SKU in response to new subscriptions being provided and previous subscriptions expiring.

In FIG. 6, an exemplary method 600 for enabling features of an SoC is shown in flow diagram form. The method 600 may be performed in a computing device having the SoC. As indicated by block 602, the method 600 may include providing a subscription request. As described above, providing a subscription request may be performed or controlled by, for example, feature subscription circuitry of the SoC. As indicated by block 604, the method 600 may also include transmitting the subscription request to an SoC configuration provider system via a data communication link. As indicated by block 606, the method 600 may further include receiving a response to the subscription request from the SoC configuration provider system via the data communication link. As indicated by block 608, the method 600 may still further include providing SoC configuration information based on the response. As described above, providing SoC configuration information may be performed or controlled by, for example, the feature subscription circuitry. As indicated by block 610, the method 600 may yet further include providing feature enablement signals based on the SoC configuration information to core logic circuitry of the SoC. As described above, providing feature enablement signals may be performed or controlled by, for example, feature enablement circuitry of the SoC.

Figure 7:
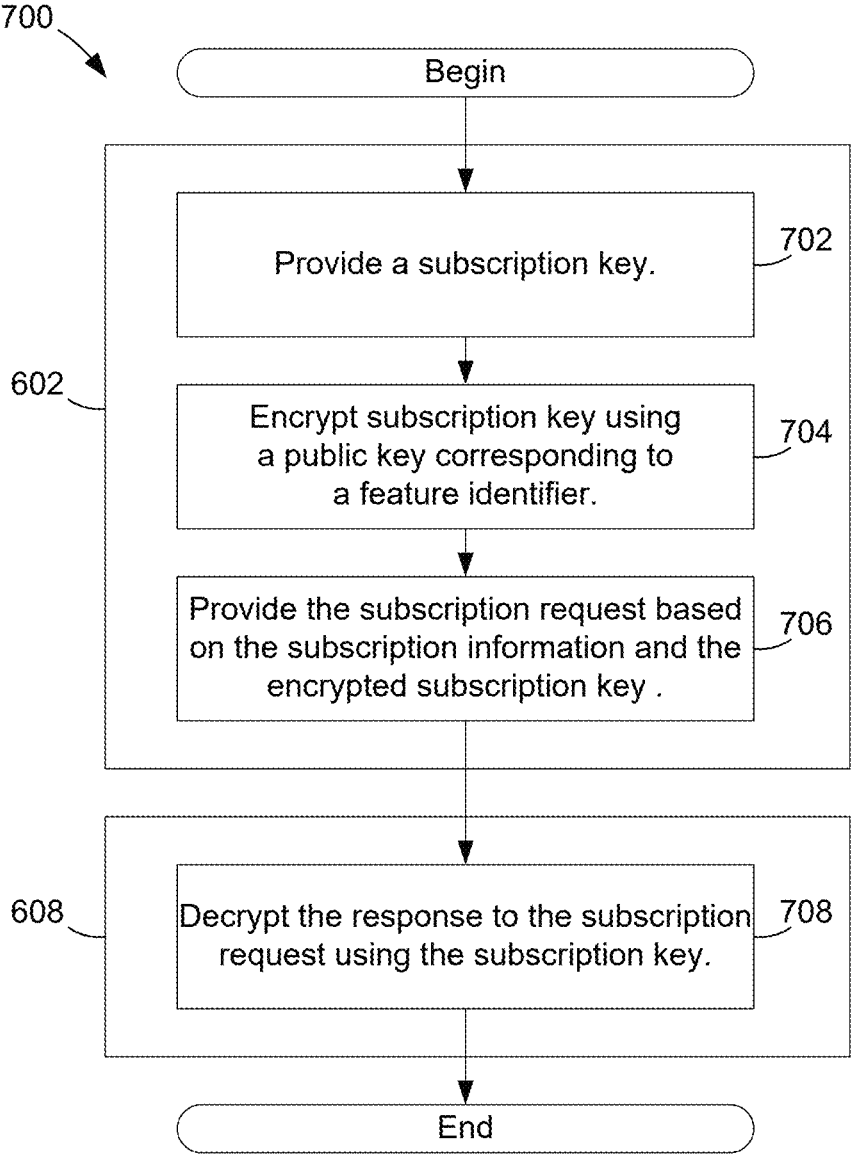
FIG. 7 is a flow diagram illustrating an example of a portion of the method of FIG. 6, in accordance with exemplary embodiments.

In FIG. 7, an exemplary method 700 for providing a subscription request is shown in flow diagram form. The method 700 may include an example of the operations described above with regard to block 602 (FIG. 6). As indicated by block 702, the method 700 may include providing a subscription key. As described above, the subscription key may be cryptographically secured. For example, a pseudo-random number generator may provide the subscription key. As indicated by block 704, the method 700 may include encrypting the subscription key using a public key corresponding to the feature identifier. As indicated by block 706, the method 700 may further include providing the subscription request based on the subscription information and the encrypted subscription key. As indicated by block 708, providing the SoC configuration information (block 608 in FIG. 6) may further include decrypting the response using the subscription key.

Figure 8:
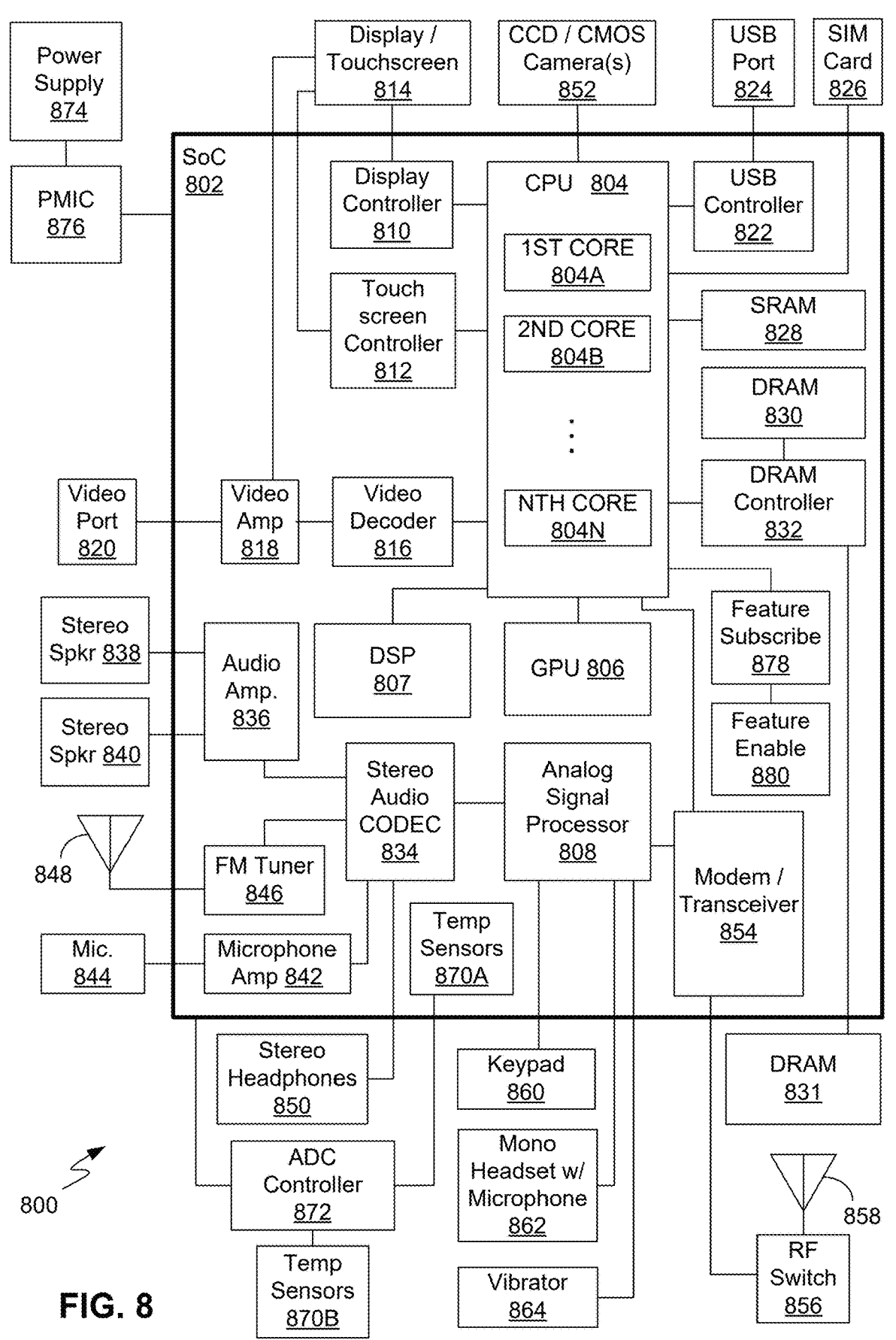
FIG. 8 is a block diagram illustrating an example of a portable computing device having an SoC feature subscription system, in accordance with exemplary embodiments.

FIG. 8 illustrates an example of a portable computing device (PCD) 800, in which exemplary embodiments of systems, methods, and other examples of enabling features of an SoC may be provided. The PCD 800 may be an example of the above-described computing device 102 (FIG. 1). The PCD 800 may be, for example, a cellular telephone or smartphone. For purposes of clarity, some data buses, interconnects, signals, etc., are not shown in FIG. 8.

The PCD 800 may include an SoC 802. The SoC 802 may be an example of the above-described SoC 108 (FIG. 1) or 202 (FIG. 2). The SoC 802 may include a number of processing subsystems, such as a CPU 804, a GPU 806, a digital signal processor (DSP) 807, an analog signal processor 808, a transceiver or modem subsystem 854, etc. Any or all of these subsystems or other components described below may include one or more hardware (circuitry) features that may be selectably enabled or disabled. The CPU 804 may include one or more CPU cores, such as a first CPU core 804A, a second CPU core 804B, etc., through an Nth CPU core 804N. The number of such CPU cores that are enabled may be an example of such a selectably enablable feature.

A display controller 810 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus (USB) controller 822 may also be coupled to CPU 804, and a USB port 824 may be coupled to the USB controller 822. A subscriber identity module (SIM) card 826 may also be coupled to the CPU 804.

The CPU 804 may be coupled to one or more memories, with which the CPU 804 or other processors may initiate memory transactions. The one or more memories may include both volatile and non-volatile memories or NVMs. Examples of volatile memories include static random access memory (SRAM) 828 and dynamic random access memory (DRAM) 830 and 831. Such memories may be internal to the SoC 802, as in the case of the DRAM 830, or external to the SoC 802, as in the case of the DRAM 831. A DRAM controller 832 coupled to the CPU 804 may control the writing of data to, and reading of data from, the DRAMs 830 and 831.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation (FM) radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS) cameras 852.

The RF transceiver or modem subsystem 854 may be coupled to the analog signal processor 808 and the CPU 804. The modem subsystem 854 may be an example of the above-described transceiver circuitry 204 (FIG. 2).

An RF switch 856 may be coupled to the modem subsystem 854 and an RF antenna 858. In addition, a keypad 860, a mono headset with a microphone 862, and a vibrator device 864 may be coupled to the analog signal processor 808. Further, the SoC 802 may have one or more internal or on-chip thermal sensors 870A and may be coupled to one or more external or off-chip thermal sensors 870B. An analog-to-digital converter controller 872 may convert voltage drops produced by the thermal sensors 870A and 870B to digital signals. A power supply 874 and a power management integrated circuit (PMIC) 876 may supply power to the SoC 802.

The SoC 802 may include feature subscription circuitry 878 and feature enablement circuitry 880. The feature subscription circuitry 878 may be an example of the above-described feature subscription circuitry 214 (FIG. 2) or 302 (FIG. 3). The feature enablement circuitry 880 may be an example of the above-described feature enablement circuitry 210 (FIG. 2) or 502 (FIG. 5). Among the elements and connections that are not shown for purposes of clarity are feature enablement signal connections between the feature enablement circuitry 880 and various core logic circuitry of the SoC 802, such as processing systems or other components, having selectably enablable features. Nevertheless, the feature enablement circuitry 878 may be configured to enable any such features of the SoC 802 based on a subscription in the manner described above.

Implementation examples are described in the following numbered clauses.

1. A method for enabling features of a system-on-chip (SoC), comprising:
   providing, by feature subscription circuitry of the SoC, a subscription request;
   transmitting the subscription request to a configuration provider system via a data communication link;
   receiving a response to the subscription request from the configuration provider system via the data communication link;
   providing, by the feature subscription circuitry, SoC configuration information based on the response; and
   providing, by feature enablement circuitry of the SoC, feature enablement signals based on the SoC configuration information to core logic circuitry of the SoC.

2. The method of clause 1, wherein:
   providing the subscription request comprises:
      providing a subscription key;
      encrypting the subscription key using a public key corresponding to the feature identifier; and
      providing the subscription request based on subscription information and an encrypted subscription key; and
   providing the SoC configuration information comprises decrypting the response using the subscription key.

3. The method of clause 1 or 2, wherein:

the subscription request includes subscription information comprising a user identifier identifying a subscription requestor, a device identifier identifying the SoC, a feature identifier identifying a feature requested by the subscription requestor, and a subscription time identifier; and providing the feature enablement signals includes providing the feature enablement signals for a limited time duration corresponding to the subscription time identifier.

4. The method of any of clauses 1-3, wherein providing the feature enablement signals comprises:

storing the SoC configuration information in a memory;

starting a timer configured to time the limited time duration; and erasing the SoC configuration information from the memory in response to expiration of the timer.

5. The method of clause 4, further comprising, in response to expiration of the timer, providing the feature enablement signals based on a fuse array instead of providing the feature enablement signals based on the SoC configuration information.

6. The method of clause 2, further comprising:

providing, by inverse function generator circuitry of the configuration provider system, the subscription information and the encrypted subscription key based on the subscription request, wherein the subscription information comprises a user identifier identifying a subscription requestor, a device identifier identifying the SoC, and a feature identifier identifying a feature requested by the subscription requestor;

decrypting the encrypted subscription key using a private key corresponding to the feature identifier;

reading current SoC configuration information from storage using the device identifier; and providing updated SoC configuration information based on the current SoC configuration information and the feature identifier.

7. The method of clause 6, further comprising:

encrypting the updated SoC configuration information using the subscription key; and providing the response to the subscription request, including providing encrypted updated SoC configuration information.

8. A system for enabling features of a system-on-chip (SoC), comprising:

feature subscription circuitry in the SoC configured to provide a subscription request, to transmit the subscription request to a configuration provider system via a data communication link, to receive a response to the subscription request from the configuration provider system via the data communication link, and to provide SoC configuration information based on the response; and feature enablement circuitry in the SoC configured to provide feature enablement signals based on the SoC configuration information to core logic circuitry of the SoC.

9. The system of clause 8, wherein:

the feature subscription circuitry being configured to provide the subscription request includes being configured to provide a subscription key, to encrypt the subscription key using a public key corresponding to the feature identifier, and to provide the subscription request based on subscription information and an encrypted subscription key; and the feature subscription circuitry being configured to provide the SoC configuration information includes being configured to decrypt the response using the subscription key.

10. The system of clause 8 or 9, wherein:

the subscription request includes subscription information comprising a user identifier identifying a subscription requestor, a device identifier identifying the SoC, a feature identifier identifying a feature requested by the subscription requestor, and a subscription time identifier; and the feature enablement circuitry includes subscription control circuitry configured to provide the feature enablement signals for a limited time duration corresponding to the subscription time identifier.

11. The system of any of clauses 8-10, wherein:

the feature subscription circuitry is configured to store the SoC configuration information in a memory; and the subscription control circuitry includes a timer configured to time the limited time duration and erasing circuitry configured to erase the SoC configuration information from the memory in response to expiration of the timer.

12. The system of clause 11, wherein:

the feature enablement circuitry includes a fuse array; and the subscription control circuitry is further configured to, in response to expiration of the timer, provide the feature enablement signals based on the fuse array instead of providing the feature enablement signals based on the SoC configuration information.

13. The system of clause 9, wherein the configuration provider system comprises:

inverse function generator circuitry configured to provide the subscription information and the encrypted subscription key based on the subscription request, wherein the subscription information comprises a user identifier identifying a subscription requestor, a device identifier identifying the SoC, and a feature identifier identifying a feature requested by the subscription requestor;

key decryption circuitry configured to decrypt the encrypted subscription key using a private key corresponding to the feature identifier; and configuration update circuitry configured to read current SoC configuration information from storage using the device identifier and to provide updated SoC configuration information based on the current SoC configuration information and the feature identifier.

14. The system of clause 13, further comprises response encryption circuitry in the configuration provider system configured to encrypt the updated SoC configuration information using the subscription key and to provide encrypted updated SoC configuration information in the response to the subscription request.

15. A system for providing a system-on-chip (SoC) configuration, comprising:

subscription request processing circuitry configured to receive, via a data communication link, a subscription request from a device having the SoC, the subscription request including a device identifier identifying the SoC and a user identifier identifying a subscription requestor; and configuration providing circuitry configured to provide updated SoC configuration information based on the subscription request and current SoC configuration information for the SoC identified by the device identifier, and configured to transmit the updated SoC configuration information to the device having the SoC via the data communication link.

16. The system of clause 15, wherein the subscription request processing circuitry comprises:

inverse function generator circuitry configured to provide an encrypted subscription key based on the subscription request, wherein the subscription request further includes a feature identifier identifying a feature requested by the subscription requestor; and key decryption circuitry configured to decrypt the encrypted subscription key using a private key corresponding to the feature identifier;

wherein the configuration providing circuitry is configured to read the current SoC configuration information from storage using the device identifier and to provide the updated SoC configuration information based on the current SoC configuration information and the feature identifier.

17. The system of clause 16, wherein the configuration providing circuitry includes response encryption circuitry configured to encrypt the updated SoC configuration information using the subscription key and to provide encrypted updated SoC configuration information in the response to the subscription request.

18. The system of clause 17, wherein the response encryption circuitry is further configured to provide an encrypted subscription time based on the subscription time identifier and to include the encrypted subscription time in the response to the subscription request.

19. The system of any of clauses 15-18, further comprising subscription request information verification circuitry configured to verify the subscription request, and wherein the configuration providing circuitry is configured to refrain from providing the updated SoC configuration information when verification of the subscription request fails.

20. The system of clause 19, wherein the subscription request information verification circuitry comprises:

inverse function generator circuitry configured to provide hashed subscription request information based on the subscription request, wherein the subscription request further includes a feature identifier identifying a feature requested by the subscription requestor;

hashing circuitry configured to provide a hashed value based on the feature identifier, the user identifier, and the device identifier; and comparator circuitry configured to compare the hashed subscription request information with the hashed value, and wherein the configuration providing circuitry is configured to refrain from providing the updated SoC configuration information when the hashed subscription information does not match the hashed value.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for enabling features of a system-on-chip (SoC), comprising:

providing, by feature subscription circuitry of the SoC, a subscription request;

transmitting the subscription request to a configuration provider system via a data communication link, wherein the subscription request includes subscription information comprising a user identifier identifying a subscription requestor, a device identifier identifying the SoC, a feature identifier identifying a feature requested by the subscription requestor, and a subscription time identifier;

receiving a response to the subscription request from the configuration provider system via the data communication link;

providing, by the feature subscription circuitry, SoC configuration information based on the response; and providing, by feature enablement circuitry of the SoC, feature enablement signals for a limited time duration corresponding to the subscription time identifier based on the SoC configuration information to core logic circuitry of the SoC.

2. The method of claim 1, wherein:

providing the subscription request comprises:

providing a subscription key;

encrypting the subscription key using a public key corresponding to the feature identifier; and providing the subscription request based on subscription information and an encrypted subscription key; and providing the SoC configuration information comprises decrypting the response using the subscription key.

3. The method of claim 2, further comprising:

providing, by inverse function generator circuitry of the configuration provider system, the subscription information and the encrypted subscription key based on the subscription request;

decrypting the encrypted subscription key using a private key corresponding to the feature identifier;

reading current SoC configuration information from storage using the device identifier; and providing updated SoC configuration information based on the current SoC configuration information and the feature identifier.

4. The method of claim 3, further comprising:

encrypting the updated SoC configuration information using the subscription key; and providing the response to the subscription request, including providing encrypted updated SoC configuration information.

5. The method of claim 1, wherein providing the feature enablement signals comprises:

storing the SoC configuration information in a memory;

starting a timer configured to time the limited time duration; and erasing the SoC configuration information from the memory in response to expiration of the timer.

6. The method of claim 5, further comprising, in response to expiration of the timer, providing the feature enablement signals based on a fuse array instead of providing the feature enablement signals based on the SoC configuration information.

7. A system for enabling features of a system-on-chip (SoC), comprising:

feature subscription circuitry in the SoC configured to provide a subscription request, to transmit the subscription request to a configuration provider system via a data communication link, to receive a response to the subscription request from the configuration provider system via the data communication link, and to provide SoC configuration information based on the response, wherein the subscription request includes subscription information comprising a user identifier identifying a subscription requestor, a device identifier identifying the SoC, a feature identifier identifying a feature requested by the subscription requestor, and a subscription time identifier; and feature enablement circuitry in the SoC configured to provide feature enablement signals for a limited time duration corresponding to the subscription time identifier based on the SoC configuration information to core logic circuitry of the SoC.

8. The system of claim 7, wherein:

the feature subscription circuitry being configured to provide the subscription request includes being configured to provide a subscription key, to encrypt the subscription key using a public key corresponding to the feature identifier, and to provide the subscription request based on subscription information and an encrypted subscription key; and the feature subscription circuitry being configured to provide the SoC configuration information includes being configured to decrypt the response using the subscription key.

9. The system of claim 8, wherein the configuration provider system comprises:

inverse function generator circuitry configured to provide the subscription information and the encrypted subscription key based on the subscription request;

key decryption circuitry configured to decrypt the encrypted subscription key using a private key corresponding to the feature identifier; and configuration update circuitry configured to read current SoC configuration information from storage using the device identifier and to provide updated SoC configuration information based on the current SoC configuration information and the feature identifier.

10. The system of claim 9, further comprising response encryption circuitry in the configuration provider system configured to encrypt the updated SoC configuration information using the subscription key and to provide encrypted updated SoC configuration information in the response to the subscription request.

11. The system of claim 8, wherein:

the feature subscription circuitry is configured to store the SoC configuration information in a memory; and the subscription control circuitry includes a timer configured to time the limited time duration and erasing circuitry configured to erase the SoC configuration information from the memory in response to expiration of the timer.

12. The system of claim 11, wherein:

the feature enablement circuitry includes a fuse array; and the subscription control circuitry is further configured to, in response to expiration of the timer, provide the feature enablement signals based on the fuse array instead of providing the feature enablement signals based on the SoC configuration information.

13. A system for providing a system-on-chip (SoC) configuration, comprising:

subscription request processing circuitry configured to receive, via a data communication link, a subscription request from a device having the SoC, the subscription request including a device identifier identifying the SoC, a user identifier identifying a subscription requestor, and a subscription time identifier;

configuration providing circuitry configured to provide updated SoC configuration information based on the subscription request and current SoC configuration information for the SoC identified by the device identifier, and configured to transmit the updated SoC configuration information to the device having the SoC via the data communication link; and feature enablement circuitry in the SoC configured to provide feature enablement signals for a limited time duration corresponding to the subscription time identifier based on the updated SoC configuration information to core logic circuitry of the SoC.

14. The system of claim 13, wherein the subscription request processing circuitry comprises:

inverse function generator circuitry configured to provide an encrypted subscription key based on the subscription request, wherein the subscription request further includes a feature identifier identifying a feature requested by the subscription requestor; and key decryption circuitry configured to decrypt the encrypted subscription key using a private key corresponding to the feature identifier;

wherein the configuration providing circuitry is configured to read the current SoC configuration information from storage using the device identifier and to provide the updated SoC configuration information based on the current SoC configuration information and the feature identifier.

15. The system of claim 14, wherein the configuration providing circuitry includes response encryption circuitry configured to encrypt the updated SoC configuration information using the subscription key and to provide encrypted updated SoC configuration information in the response to the subscription request.

16. The system of claim 15, wherein the response encryption circuitry is further configured to provide an encrypted subscription time based on the subscription time identifier and to include the encrypted subscription time in the response to the subscription request.

17. The system of claim 13, further comprising subscription request information verification circuitry configured to verify the subscription request, and wherein the configuration providing circuitry is configured to refrain from providing the updated SoC configuration information when verification of the subscription request fails.

18. The system of claim 17, wherein the subscription request information verification circuitry comprises:

inverse function generator circuitry configured to provide hashed subscription request information based on the subscription request, wherein the subscription request further includes a feature identifier identifying a feature requested by the subscription requestor;

hashing circuitry configured to provide a hashed value based on the feature identifier, the user identifier, and the device identifier; and comparator circuitry configured to compare the hashed subscription request information with the hashed value, and wherein the configuration providing circuitry is configured to refrain from providing the updated SoC configuration information when the hashed subscription information does not match the hashed value.

* * * * *